United States Patent [19]
Blaschek et al.

[11] Patent Number: 5,121,982
[45] Date of Patent: Jun. 16, 1992

[54] FILM TRANSPORT DEVICE

[75] Inventors: Otto Blaschek, Aschheim, Fed. Rep. of Germany; Ernst Tschida; Josef Hass, both of Vienna, Austria

[73] Assignee: Arnold & Richter Cine Technik GmbH & Co. Betrebs KG, Munich, Fed. Rep. of Germany

[21] Appl. No.: 576,402

[22] PCT Filed: Mar. 9, 1989

[86] PCT No.: PCT/DE89/00157
§ 371 Date: Oct. 26, 1990
§ 102(e) Date: Oct. 26, 1990

[87] PCT Pub. No.: WO89/08866
PCT Pub. Date: Sep. 21, 1989

[30] Foreign Application Priority Data

Mar. 11, 1988 [DE] Fed. Rep. of Germany ....... 3808045

[51] Int. Cl.$^5$ .............................................. G03B 1/56
[52] U.S. Cl. ................................... 352/159; 352/157; 352/14
[58] Field of Search .................... 352/157, 158, 159, 14

[56] References Cited

U.S. PATENT DOCUMENTS

| | | | |
|---|---|---|---|
| 1,973,477 | 9/1934 | Fritts | 351/157 |
| 3,119,300 | 1/1964 | Barocela | 352/157 |
| 3,490,837 | 1/1970 | Pierez et al. | 352/157 |
| 3,642,357 | 2/1972 | Meyer . | |
| 3,702,726 | 11/1972 | Takeichi et al. | 352/157 |
| 3,734,602 | 5/1973 | Deck | 352/157 |
| 4,037,949 | 7/1977 | Pasturczak et al. | 352/158 |
| 4,146,313 | 3/1979 | Feltz et al. | 352/157 |
| 4,150,886 | 4/1979 | Merkel et al. . | |
| 4,697,896 | 10/1987 | Fox . | |

FOREIGN PATENT DOCUMENTS

| | | |
|---|---|---|
| WO83/00233 | 1/1983 | European Pat. Off. . |
| 1089264 | 9/1960 | Fed. Rep. of Germany . |
| 2027882 | 12/1971 | Fed. Rep. of Germany . |
| 2347411 | 4/1974 | Fed. Rep. of Germany . |
| 2738322 | 3/1978 | Fed. Rep. of Germany . |
| 2722378 | 5/1978 | Fed. Rep. of Germany . |
| 2808974 | 9/1979 | Fed. Rep. of Germany . |
| 2822392 | 12/1979 | Fed. Rep. of Germany . |
| 312778A1 | 2/1983 | Fed. Rep. of Germany . |
| 3217014A1 | 11/1983 | Fed. Rep. of Germany . |
| 2760024 | 5/1986 | Fed. Rep. of Germany . |
| 2371701 | 6/1978 | France . |
| 2054887A | 2/1981 | United Kingdom . |

*Primary Examiner*—Monroe H. Hayes
*Attorney, Agent, or Firm*—Fish & Richardson

[57] ABSTRACT

Film transport device in a film projector with winding plates located on both sides of a film gate and drivable by one winding motor, with supply and takeup devices respectively located between the winding plates and the film gate to create film loops on both sides of the film gate, a film transport device between the supply and takeup devices, and a film channel to guide the film placed in the film projector. After film (1) is placed in the open film channel, film transport device (2) and one of the two supply and takeup devices (3, 4) is brought into engagement with film (1) and film transport device (2) is operated at an rpm greater than that of one of the supply or takeup devices (3 or 4) until a first film loop of a presettable length is formed between film transport device (2) and one of the supply and/or takeup devices (3 or 4). Then the other supply and takeup device (4 or 3) is brought into engagement with film (1) and film transport device (2) is operated at an rpm and/or rotational direction such that a portion of the first film loop is advanced to form a second film loop on the other side of film gate (8).

15 Claims, 5 Drawing Sheets

FILM TRANSPORT DEVICE

The invention relates to a film transport device.

DE-A1-31 27 778 teaches a device for transporting and guiding a film in a film projector, said device having supply and takeup plates mounted on fixed positions on both sides of the film gate, with one drivable sprocket associated with each plate. The two sprockets, a loop forming device, and a film pressure skid are mounted on a movable carriage, said carriage being displaceable on tracks integral with the system, parallel to the optical axis of the lens of the film projector between a freely accessible supply and rewind position and a projection position.

At the beginning of the projection mode, the film pressure skid is displaced against a film contact rail comprising the film gate, with the loop forming device automatically forming a loop at this time between the takeup sprocket and the film contact rail and between the film contact rail and the supply sprocket. In this known device, however, it is necessary to incorporate an intermediate stop to switch from the supply and rewind positions to the projection position.

DE-C2-30 27 882 teaches a film transport device for a motion picture camera, said device having two separate sprockets for supplying the unexposed film and for winding up the exposed film on a film takeup reel. Coupling devices are provided between the drive system for the separate sprockets and the sprockets to influence the rotation of the sprockets. Because of the continuous film transport by the sprockets and the intermittent film transport in the vicinity of the film gate, film loops must be provided before and after the film gate, said loops being formed by a relative twisting of one film transport sprocket relative to the other film transport sprocket.

However, in film projectors, in contrast to motion picture cameras, it is necessary for loop formation to be completed quickly to ensure a short time interval until the film projectors are fully ready to operate. To locate certain frames in the film, it is necessary in many applications in medicine, sports reporting, and the like to insert films into the film projector, project film sequences, and remove the films from the projector once more. In known projectors, this procedure is cumbersome and extremely time-consuming.

The goal of the invention is to provide a film transport device which ensures that only a brief time interval elapses until the projector is fully ready to operate and permits simple and rapid startup, and insertion and removal of a film as well as creating the precondition for being able to remove even partially unreeled film reels from the projector.

The solution according to the invention provides a film transport device which permits simple and comfortable operation of the projector during startup and during insertion as well as removal of the film. To insert the film it is merely necessary to place the film reel on an empty winding plate, feed the film into the wide open film channel, and attach the end of the film to the opposite empty core by turning it several times. At the press of a button, all other steps, including closing the film channel and forming the loop, take place automatically in one to two seconds to achieve complete operational readiness. To remove the film when the film reels are partially unwound, the film channel is opened again at the press of a button and the film can simply be removed without any danger of damaging the film.

Advantageous improvements of the invention will be described in greater detail below together with the description of the preferred embodiment of the invention, with reference to the figures.

Figure 1:
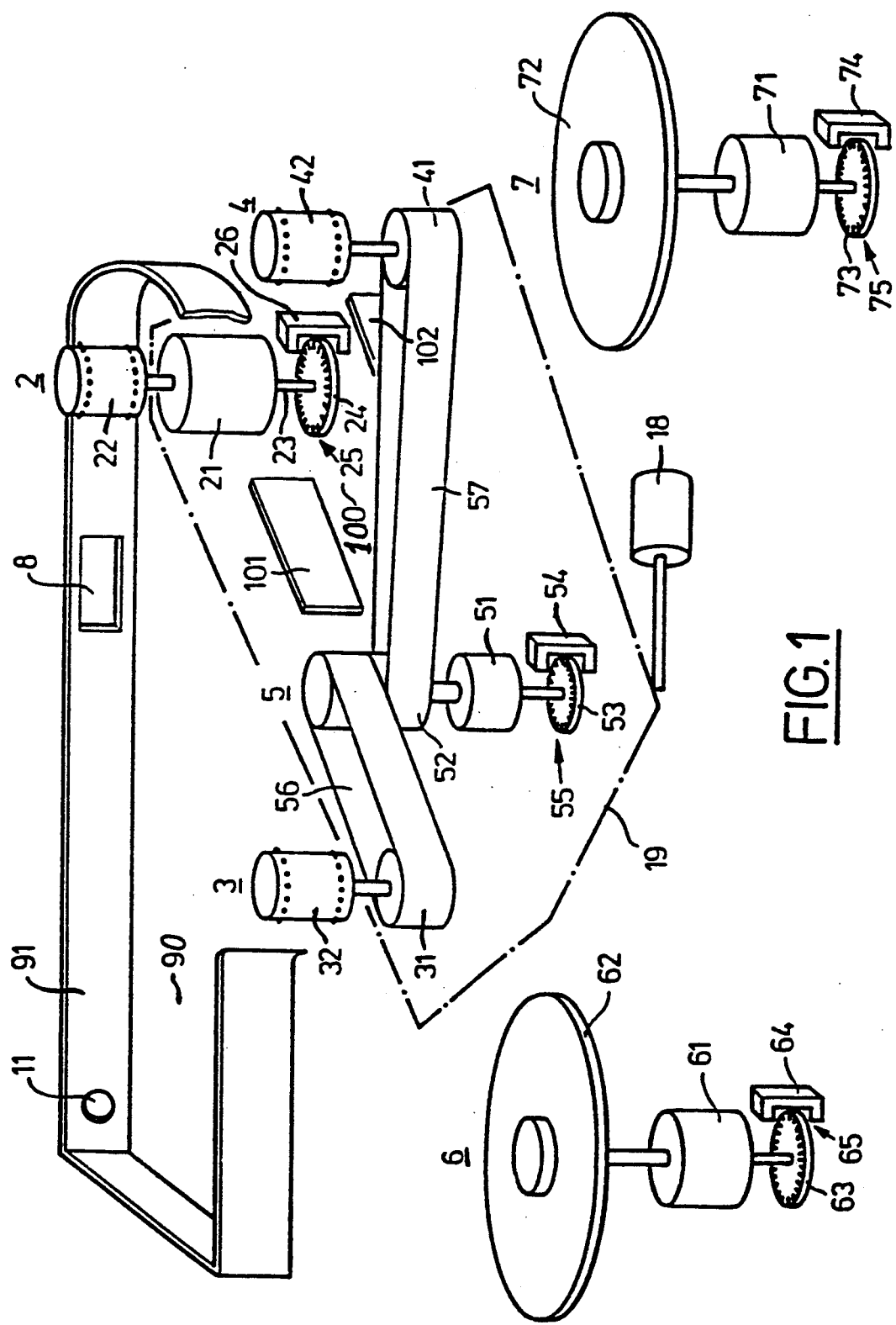
FIG. 1 is a schematic perspective view of the film channel, with the individual drive elements.

The schematic perspective view shown in FIG. 1 of the important drive elements of the film projector according to the invention shows film transport device 2, supply and takeup devices 3, 4, driven by a common drive device 5, takeup and supply devices 6 and 7 supporting the film reels, and, in a simplified schematic perspective view, film loop channels 90, 100 located on both sides of film gate 8 to receive the film loops.

Film transport device 2 contains a main motor 21 consisting of a highly dynamic DC servo motor, which transmits its rotary motion through a directly driven film transport sprocket 22 to film 1. Main motor 21 is permanently connected by a shaft 23 with an angle position indicator 24 of a sensor 26 which uses an optoelectronic position sensing device 25 to determine and transmit the exact position of main motor 21.

Supply and takeup devices 3, 4 contain drive shafts 31, 41, each of which is permanently connected with a sprocket 32, 42 and transports the inserted film continuously. Drive shafts 31, 41 are connected by belts 56, 57 with drive rollers 52 of drive device 5, said device being rigidly coupled with a drive motor 51 by a shaft, said motor consisting of a regulated DC motor whose rpm is regulated in proportion to the frame frequency setting. The rpm and rotational direction of drive motor 51 are determined by an angle position indicator 53 connected permanently with the motor shaft, said disk forming a sensor 55 together with an optoelectronic sensing device 54.

Takeup and supply devices 6, 7 to receive the film reels comprise winding plates 62, 72, each of which is connected with a winding motor 61, 71 by a shaft, said motor being designed as a DC motor. To determine the rpm and rotational direction of winding motors 61, 71, an angular position disk 63, 73 permanently connected with the shaft of the corresponding winding motor 61 or 71 is used, forming, together with an optoelectronic sensing device 64, 74, a sensing device 65, 75.

Film loop channels 90, 100 serve to receive the film loops formed on both sides of film gate 8, and in the present case, because of the special design of the control and regulating device, only one loop measuring device 11 is provided in the film loop channel 90 to the left of film gate 8. Loop measuring device 11 can consist of a reflected light cabinet or an LED in conjunction with a phototransistor opposite.

An adjusting carriage 19 mounted in appropriate guides is driven by an adjusting motor 18 and carries the imaging optics, film transport device 2 including a film stage with film pressure plate, takeup and supply sprockets 32, 42, pivot skid 33, and drive device 5.

Figure 2:
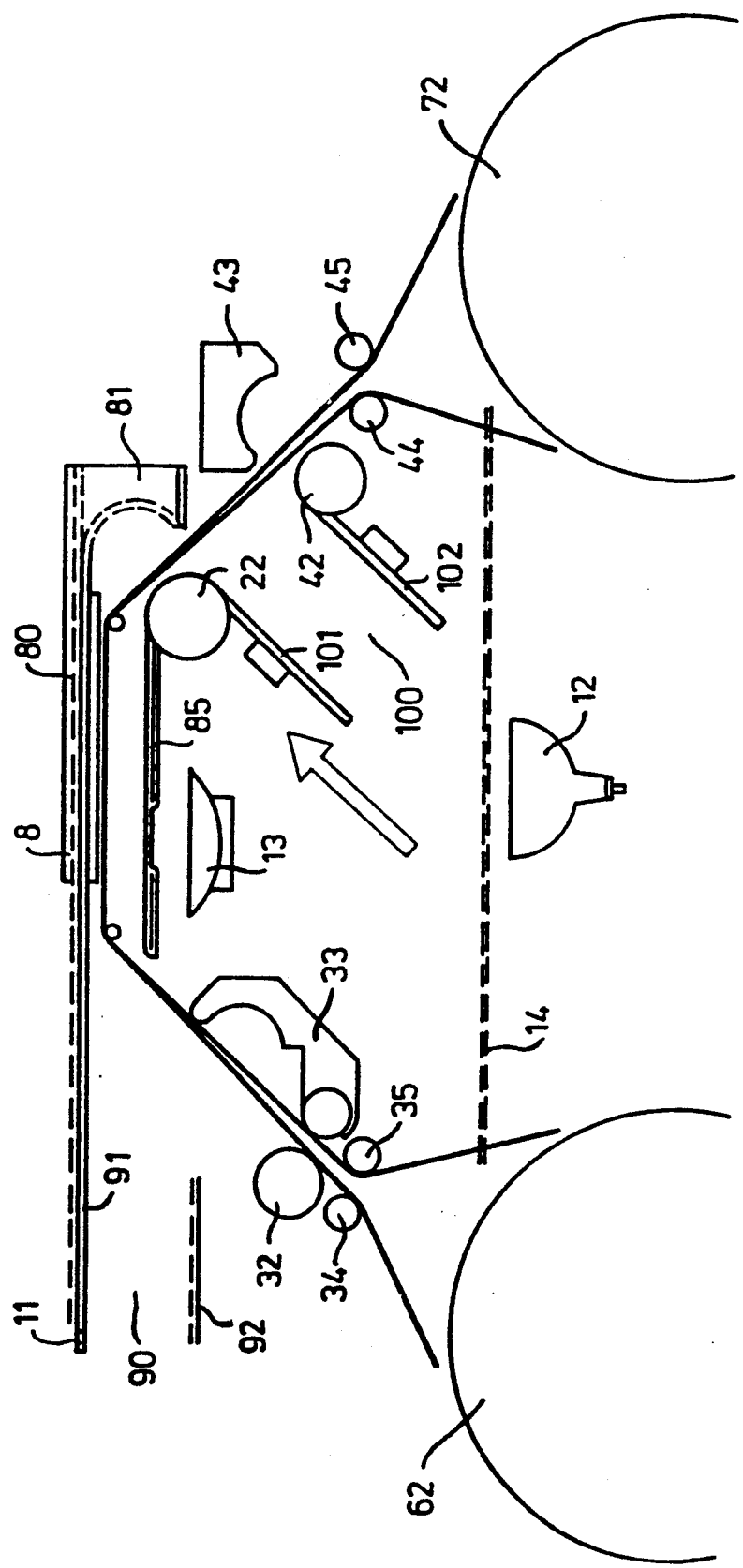
FIGS. 2 to 4 show a top view of the film projector in various phases of film loop formation.

FIG. 2 is a top view of the film projector in a first phase of film loop formation.

Winding plates 62, 72 serve to receive the film reels, and the film is optionally unwound from left-hand winding plate 62 and can be moved through the film channel described below, to right-hand winding plate 72 or vice versa. Depending on the user's choice, film 1 can also be placed in any fashion on winding plates 62 and 72, as indicated in FIG. 2 by the different film paths.

Two guide posts 34 and 35 abut left-hand winding plate 62, said posts guiding film 1 between sprocket 32 of one winding device 3 and a pivot skid 33. Similarly, two guide posts 44, 45 are located in the vicinity of right-hand winding plate 72, said posts guiding the film between sprocket 42 of the other supply or takeup winding device 4 and a pressure skid 43. Pivot skid 33 and pressure skid 43 have inner surfaces whose curvatures match the diameters of sprockets 32 and 42, so that film 1 fits closely against the corresponding sprocket 32 or 42 in the tensioned state.

Film gate 8 and film transport device 2 with film transport sprocket 22 are located between sprockets 32 and 42. Film gate 8 is part of a film contact rail 80, which has a curved film skid 81 in the vicinity of film transport sprocket 22, the curvature of said skid likewise matching the diameter of film transport sprocket 22.

A pressure stage 85, spring-mounted in a film stage, fits between the teeth of film transport sprocket 22 and, with the film channel closed, fits tightly against film 1 pressing the latter against film contact rail 80, so that the film passes film gate 8 without any lateral deflection and a continuous transition to film transport sprocket 22 is ensured.

A left-hand film loop channel 90 is provided between left-hand sprocket 32 and film gate 8, said channel being formed by parallel channel walls 91 and 92. Similarly, a right-hand film loop channel 100 is formed between film transport device 2 and film transport sprocket 22 and right-hand sprocket 42, said channel being formed by two parallel channel walls 101, 102, said walls abutting film transport sprocket 22 and righthand sprocket 42.

Film transport device 2, film pressure plate 85, supply and takeup devices 3 and 4, and film loop channel walls 101 and 102 are jointly disposed together with imaging optics 13, on an adjusting carriage 19, said carriage being moved in the direction of the arrow by means of adjusting motor 18 shown in FIG. 1 to close the film channel.

In the position shown in FIG. 2, adjusting carriage 19 has been retracted, so that the film channel is exposed and film transport device 2 and/or film transport sprocket 22 and supply and takeup devices 3, 4 have been retracted.

To insert a film, it is now merely necessary to place a film reel on an empty winding plate, usually in practice on lefthand winding plate 62, and to insert the film into the wide open film channel, and to fasten the end of the film to the opposite empty core with a few turns.

After the film has been inserted, a button marked "film channel OPEN/CLOSED" on the control panel is pressed, and then adjusting motor 18 starts, said motor through its drive causing adjusting carriage 19 to move in the direction of the arrow. Shortly before adjusting carriage 19 reaches the end position, loop formation begins.

Figure 3:
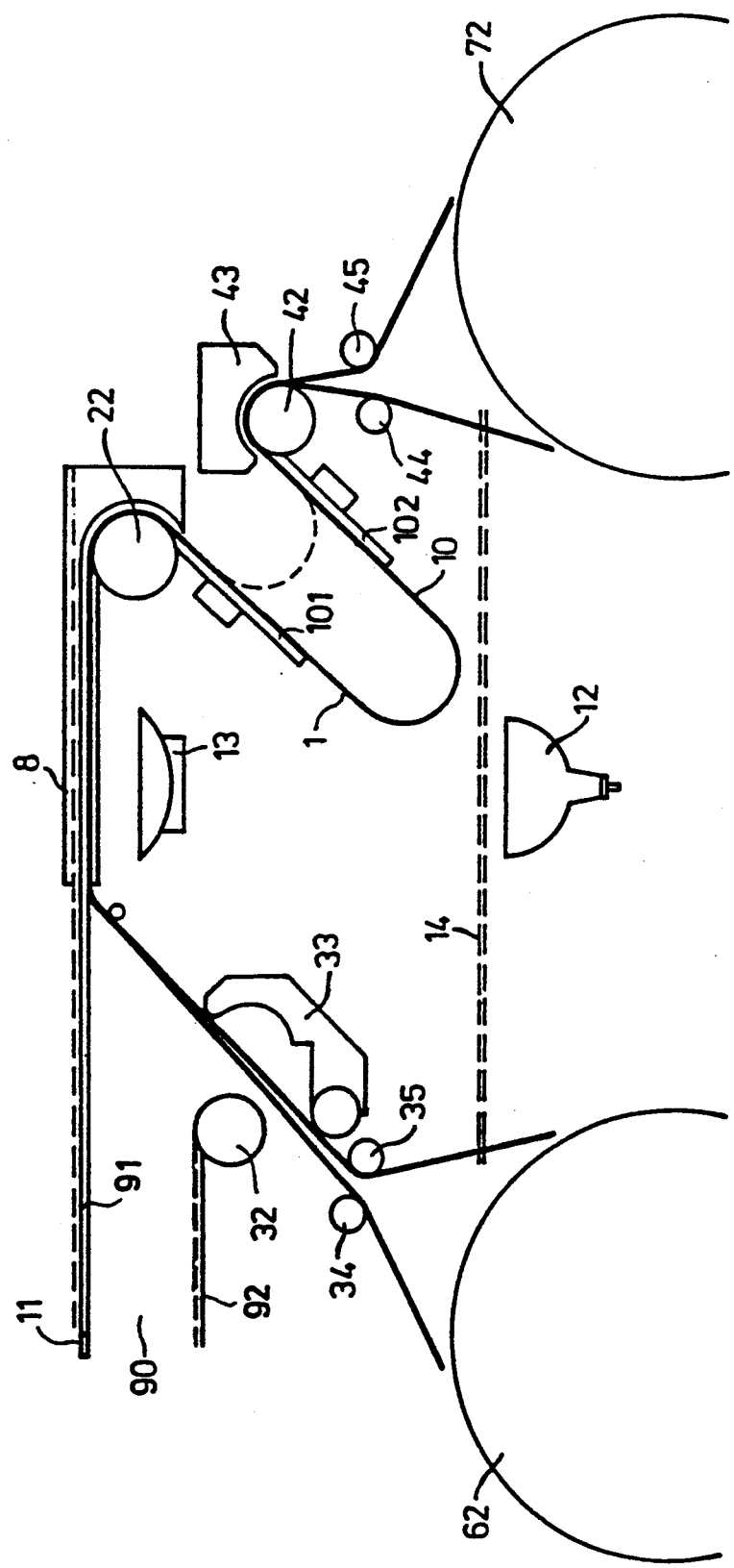

FIG. 3 shows loop formation in a first phase and shows film transport sprocket 22 abutting film skid 81 and sprocket 42 abutting pressure skid 43. As a result, both the right-hand supply and takeup sprocket 42 and film transport sprocket 22 of film transport device 2 are brought into engagement with the film, while the film is running freely between the lefthand supply or rewind sprocket 32 and pivot skid 33, both of which have been moved by adjusting carriage 19 in the direction of lefthand fixed film loop channel 9.

In this position, film transport device 2 is operated at an rpm which is greater than that of the right-hand supply and takeup sprocket 42 and film transport device 2 executes a rotation to the right, while right-hand supply and/or takeup sprocket 42 stands still. In this manner, a certain film length is pulled off left-hand winding plate 62 and a double loop length is pulled rightward into right-hand film loop channel 100.

Figure 4:
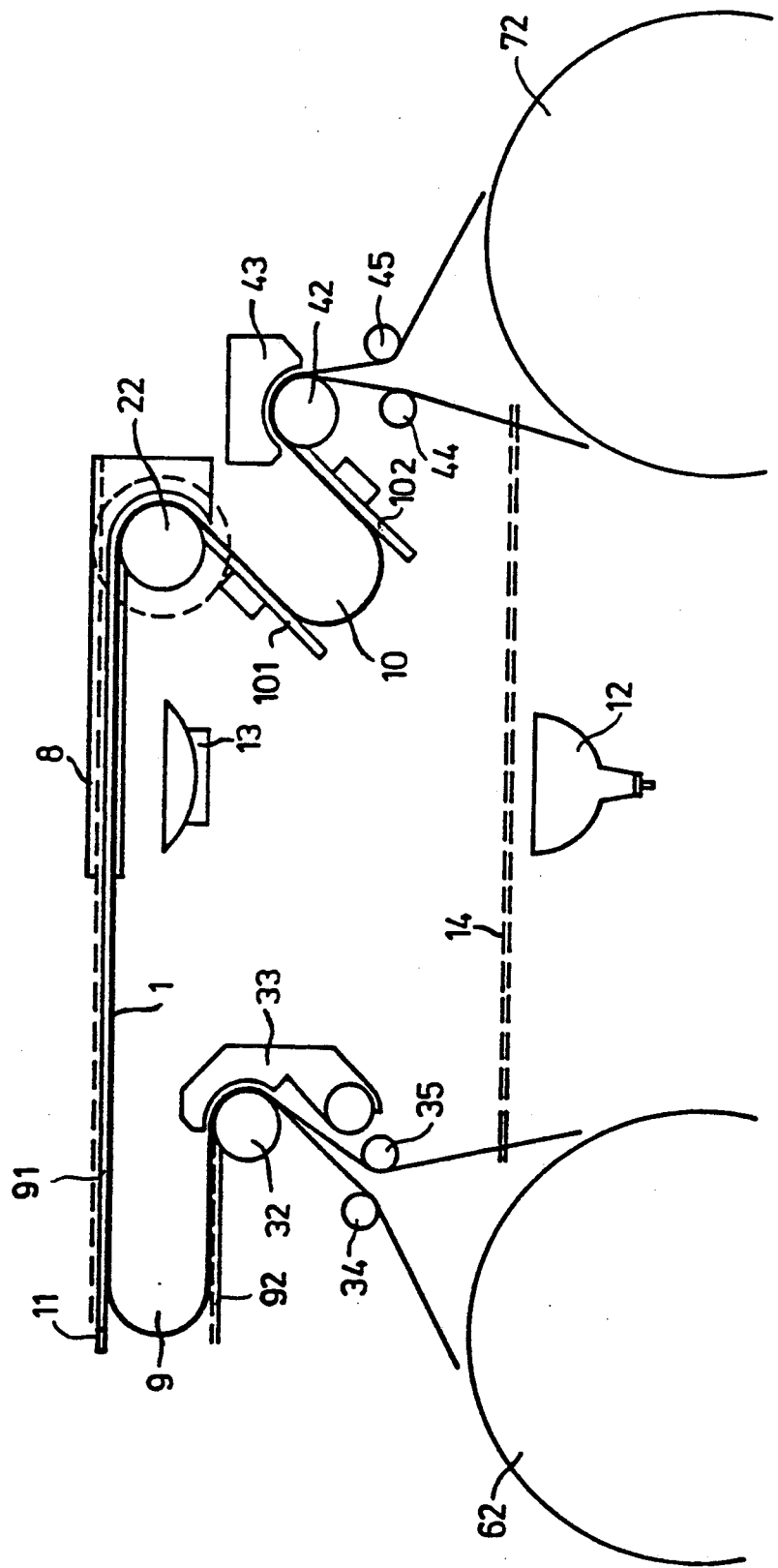

At this juncture, as shown in FIG. 4, the left-hand supply or takeup sprocket 32 located in fixed left-hand film loop channel 90 is brought into engagement with the film, with pivot skid 33 abutting left-hand supply or takeup sprocket 32. By changing the rotational direction of film transport device 2 or of film transport sprocket 22 or by performing a corresponding relative movement of film transport sprocket 22 relative to the right-hand supply or takeup sprocket 42, approximately one-half of film loop 10 located in right-hand film loop channel 100 is transported leftward into left-hand film loop channel 9 while the left-hand takeup or unwinding sprocket 32 stands still.

This completes the adjusting process; the film projector projects a fixed image, and is fully operationally ready for all film projection and transport functions.

At the same time, mechanical closure of the film channel can be performed together with the adjusting movement, so that any transport noises will be additionally damped as a result.

Figure 5:
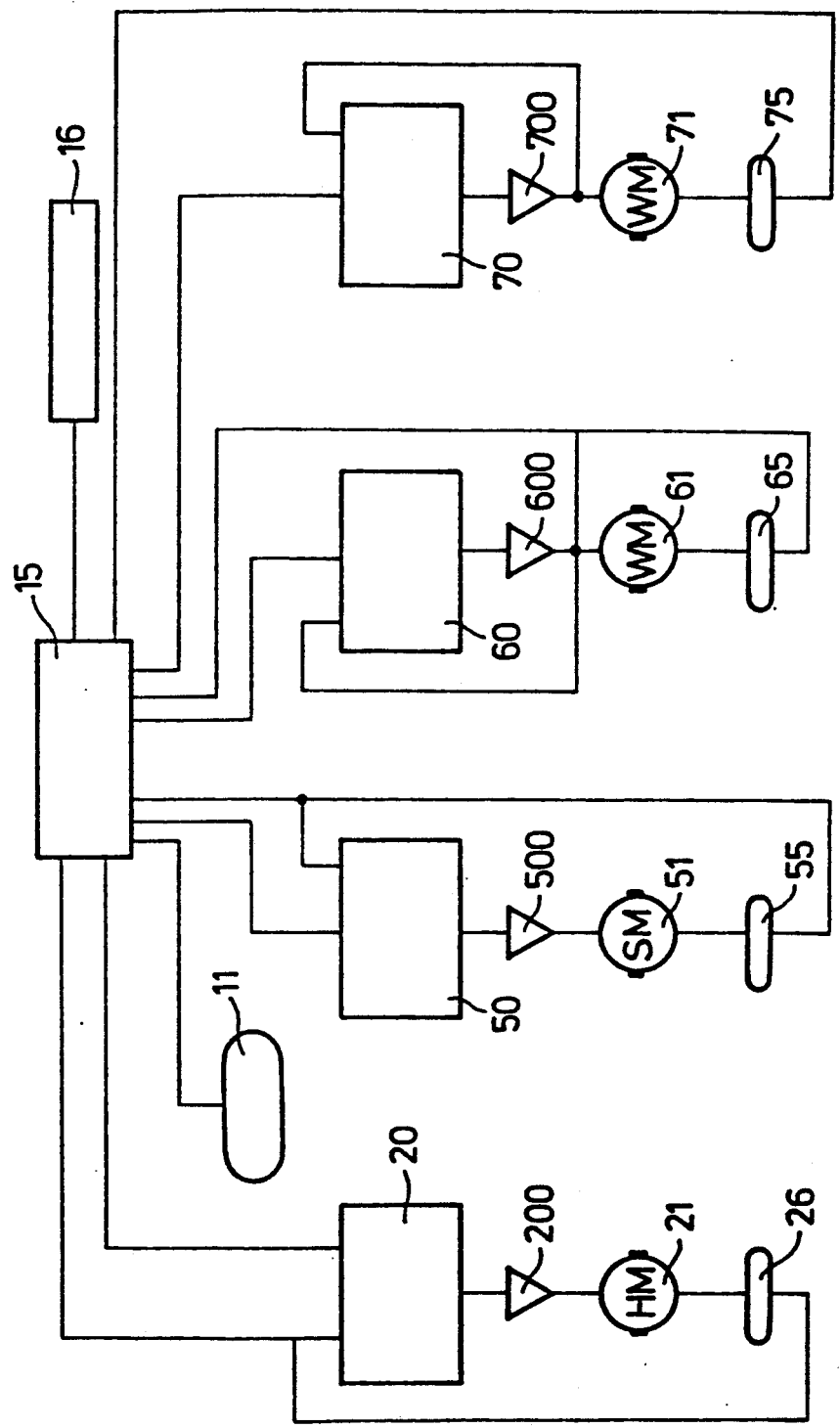
FIG. 5 is a simplified block diagram of the automatic delivery system and control circuit.

FIG. 5 shows a simplified block diagram of the control and regulating device for the film transport parts.

The higher-order control, regulating, and monitoring system 15 is connected with an entry keyboard 16 to enter desired film projector functions such as frame transport with variable transport speed, search mode, fast forward and rewind, and "film channel OPEN/-CLOSED" or the like. Preferably it includes a microprocessor which is connected to a memory for storing desired functions of the film projector.

Higher-order control, regulating, and monitoring system 15 is connected on the output side with electronic control and regulating devices 20, 50, 60, 70, 85 for the individual drive parts of the film projector. The outputs of electronic control and regulating devices 20, 50, 60, 70, 85 are connected by DC power amplifiers 200, 500, 600, 700, 86 with main motor 21 of film transport device 2, drive motor 51 of drive device 5, and left-hand winding motor 61 and right-hand winding motor 71 of the two winding devices 6 and 7 and adjusting motor 18.

Sensors 26, 55, 65, 75 of the individual drive parts, coupled with the motor shafts, deliver corresponding position, rpm, and/or rotational direction signals to the inputs of the associated control and regulating devices 20, 50 and higher-order control, regulating, and monitoring system 15.

In addition, the outputs of DC power amplifiers 600, 700 are each connected to one input of the associated control and regulating devices 60 and 70.

The signal output by loop measuring device 11 is applied to one input of control, regulating, and monitoring system 15 and to inputs of control and regulating device 20 of film transport device 2 and control and regulating device 50 of drive device 5.

During loop formation, main motor 21, preferably with drive motor 51 stopped, feeds a double film loop into right-hand film loop channel 100, with this length being produced by counting the pulses output by the sensing device, i.e. the corresponding rotational angle steps of main motor 21.

Similarly, a portion of the double loop length in right-hand film loop channel 100 is transported by corresponding pulse counting, into left-hand film loop channel 90, preferably with drive motor 51 stopped and with main motor 21 rotating in the opposite direction so that film loops of approximately the same length are formed in both film loop channels 90, 100 when film loop formation is complete.

The invention is not limited in its embodiments to the preferred embodiment described above. Rather, a number of variations are possible which make use of the solution shown, even in embodiments which are fundamentally very different. In particular, the embodiment is not limited to implementation using discrete logic modules, but is preferably accomplished with programmed logic employing a microprocessor.

We claim:

1. A film projector comprising film contact rail structure defining a film gate,
    stationary film takeup and supply plate structures spaced from said film contact rail structure, a plate drive coupled to each said plate structure,
    carriage structure,
    pressure plate structure, supply sprocket structure, takeup sprocket structure, and film transport structure on said carriage structure,
    a carriage drive for moving said carriage structure between a first position in which said pressure plate structure is spaced form said film contact rail structure and a second position in which said pressure plate structure is adjacent said film contact rail structure,
    first loop forming structure adapted to form a film loop adjacent said supply sprocket structure,
    second loop forming structure adapted to form a film loop adjacent said takeup sprocket structure, and
    film transport control for rotating said film transport structure in a first direction to form a first loop of film in one of said loop forming structures, and then to rotate said film transport structure in the opposite direction to form a second film loop in the other of said loop forming structures at the expense of said first film loop.

2. The film projector of claim 1 and further including pivot skid structure matching the curvature of said supply sprocket for coupling film to said supply sprocket.

3. The film projector of claim 1 or claim 2 wherein each said loop forming structure includes a pair of spaced contact rails, and further including a sensor for one of said film loops, said sensor being connected to said film transport control for controlling the depth of said one film loop.

4. A film projector comprising
    film gate structure,
    takeup and supply plates located on both sides of said film gate structure and driven by a winding motor,
    supply and takeup devices located between said supply and takeup plates and said film gate structure to create film loops on opposite sides of said film gate structure,
    a film transport device disposed between said supply and takeup devices,
    film guide structure for guiding film inserted into the film projector,
    carriage structure,
    said film guide structure, said film transport device, and one of said supply and takeup devices being mounted on said carriage structure,
    an adjusting motor for moving said carriage structure between a first position in which said film guide structure is spaced from said film gate and a second position in which said film guide structure is adjacent said film gate,
    first loop forming structure mounted on said carriage structure for cooperating with said film transport device and said one device for forming a first film loop between said film transport device and said one device when said carriage structure is in said second position,
    second loop forming structure, and
    film directing structure located next to the other of said supply and takeup devices for cooperation with the other of said devices to direct film into said second loop forming structure when said carriage structure is in said second position to form a second film loop on the side of said film gate structure opposite said first loop.

5. The film projector of claim 4 wherein said film guide structure includes pressure plate mounted on said carriage structure,
    said pressure plate structure being adapted to press film against said film gate structure in said second position of said carriage structure.

6. The film projector of claim 4 or claim 5 and further including film contact rail structure that includes a film skid in the vicinity of said film transport device, and wherein
    said film transport device includes a film sprocket, and the curvature of said film skid matches the diameter of said film sprocket.

7. The film projector of claim 4 wherein each of said supply and takeup devices and said film transport device includes a film sprocket, and each said loop forming structure includes two parallel loop channel walls adjacent said takeup and supply devices, respectively, for forming a film loop between said transport device film sprocket and each of said takeup and supply device sprockets.

8. The film projector of claim 7, further including a pivot skid which matches the curvature of said supply sprocket for manual coupling of film to said supply sprocket.

9. The film projector of claim 7 or claim 8 wherein each said loop forming structure includes a plurality of contact rails between said film transport device sprocket and one of said takeup and supply device sprockets, said contact rails limiting the lateral extent of said first and second loops of film, and a sensor for said second loop for limiting the depth of said second loop of film.

10. The film projector of claim 4 or claim 5 and further including a film contact rail in which said film gate structure is disposed, and wherein said second loop forming structure includes an extension of said film contact rail on the side of said film gate remote from said one device, said extension defining a first loop channel wall, structure providing a second loop channel wall parallel to said first loop channel wall, said first and second loop channel walls being spaced to define the width of said second film loop channel, and a loop measuring device located at a fixed distance from said film gate.

11. The film projector of claim 4 and further including
film transport control for rotating said film transport device in a first direction to form a first loop of film in one of said loop forming structures, and then to rotate said film transport device in the opposite direction to form a second film loop in the other of said loop forming structures at the expense of said first film loop.

12. The film projector of claim 11 and further including pivot skit structure matching the curvature of said supply sprocket for coupling film to said supply sprocket.

13. The film projector of claim 12 and further including film contact rail structure that includes a film skid in the vicinity of said film transport device, and wherein said film transport device includes a film sprocket, and the curvature of said film skid matches the diameter of said film sprocket.

14. The film projector of claim 13 wherein each of said supply and takeup devices includes a film sprocket, and each said loop forming structure includes two parallel loop channel walls adjacent said takeup and supply devices, respectively, for forming a film loop between said transport device film sprocket and each of said takeup and supply device sprockets.

15. The film projector of claim 14 wherein each said loop forming structure includes a pair of spaced contact rails, and further including a sensor for one of said film loops, said sensor being connected to said film transport control for controlling the depth of said one film loop.

* * * * *